United States Patent [19]

Weeks, Jr. et al.

[11] Patent Number: 5,008,489

[45] Date of Patent: Apr. 16, 1991

[54] ELECTRICAL CABLES AND SERPENTINE PATTERN SHIELDING TAPE THEREFOR

[75] Inventors: Herman D. Weeks, Jr., Ramsey; Robert Cella, Fairlawn, both of N.J.

[73] Assignee: Facile Holdings, Inc., Paterson, N.J.

[21] Appl. No.: 426,194

[22] Filed: Oct. 25, 1989

[51] Int. Cl.[5] .......................... H01B 7/34; B32B 15/04

[52] U.S. Cl. ...................................... 174/36; 156/291; 174/117 F; 174/117 A; 428/209; 428/344

[58] Field of Search ..................... 174/36, 115, 117 F, 174/117 A; 156/291; 428/209, 295, 344

[56] References Cited

U.S. PATENT DOCUMENTS

| | | | |
|---|---|---|---|
| 3,621,119 | 11/1971 | Sugiyama | 174/117 A X |
| 3,770,570 | 11/1973 | Swearingen et al. | 428/209 X |
| 3,846,205 | 11/1974 | Yazawa | 428/295 X |
| 4,327,246 | 4/1982 | Kincaid | 428/344 X |
| 4,596,897 | 6/1986 | Gruhn | 174/115 X |
| 4,746,767 | 5/1988 | Gruhn | 174/36 |
| 4,797,170 | 1/1989 | Hoopengardner | 156/291 X |

FOREIGN PATENT DOCUMENTS 21062 1/1936 Australia .

*Primary Examiner*—Morris H. Nimmo

*Attorney, Agent, or Firm*—Marks Murase & White

[57] ABSTRACT

An electrical cable is provided wherein a conducting member is surrounded by an insulator. Around the insulator is a shielding element which is configured such that a pressure sensitive or heat fusible adhesive is placed on a top surface of the shielding tape in a parallel, nested serpentine pattern. The shielding tape is positioned so that it surrounds the insulator and has an overlap of its top surface with its bottom surface. Due to the parallel serpentine adhesive pattern between the top surface and the bottom surface in the overlap, an effective seal against moisture is achieved, independent of the width of the individual adhesive strips. Similarly, contact between the metallic portion of the top surface and the metallic bottom surface achieves a barrier to electrical and electromagnetic interference within the electrical cable. The serpentine adhesive layer also functions to securely connect the shielding tape to the insulator.

20 Claims, 2 Drawing Sheets

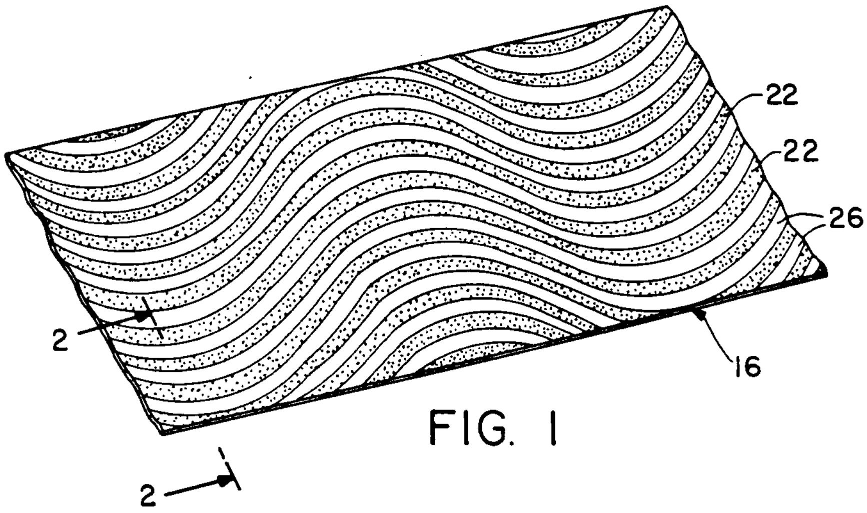
FIG. 1
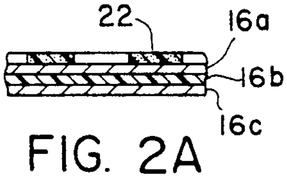
FIG. 2A
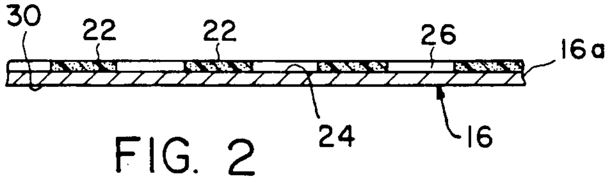
FIG. 2
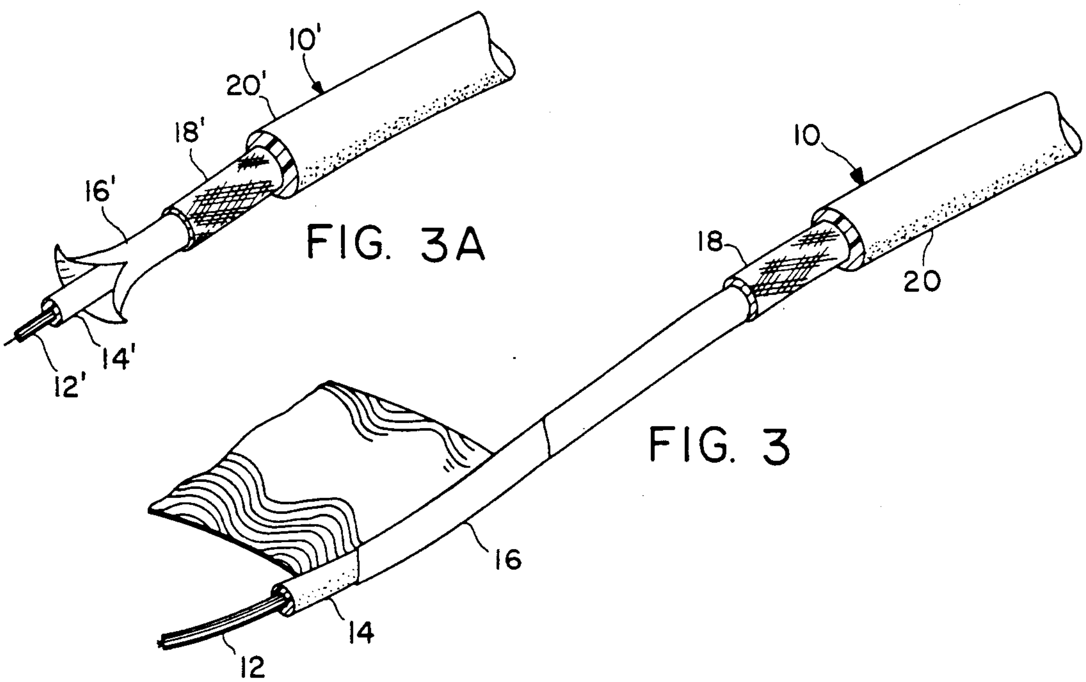
FIG. 3A
FIG. 3

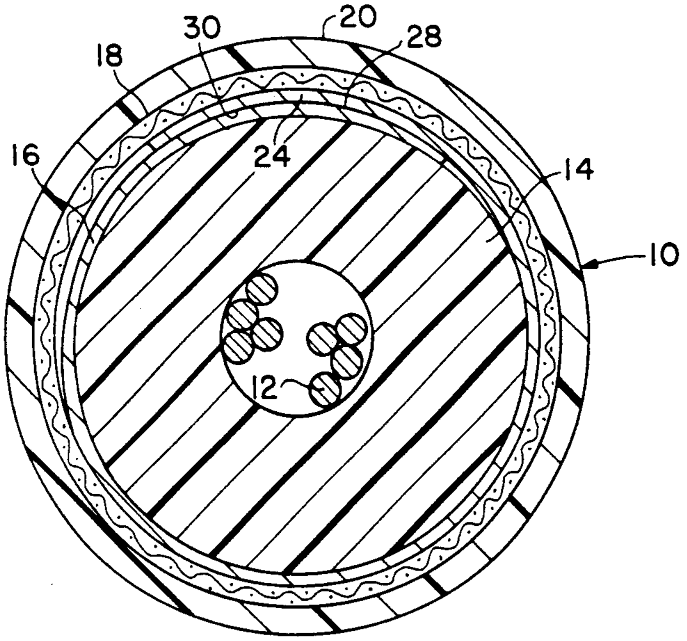
FIG. 4
FIG. 5
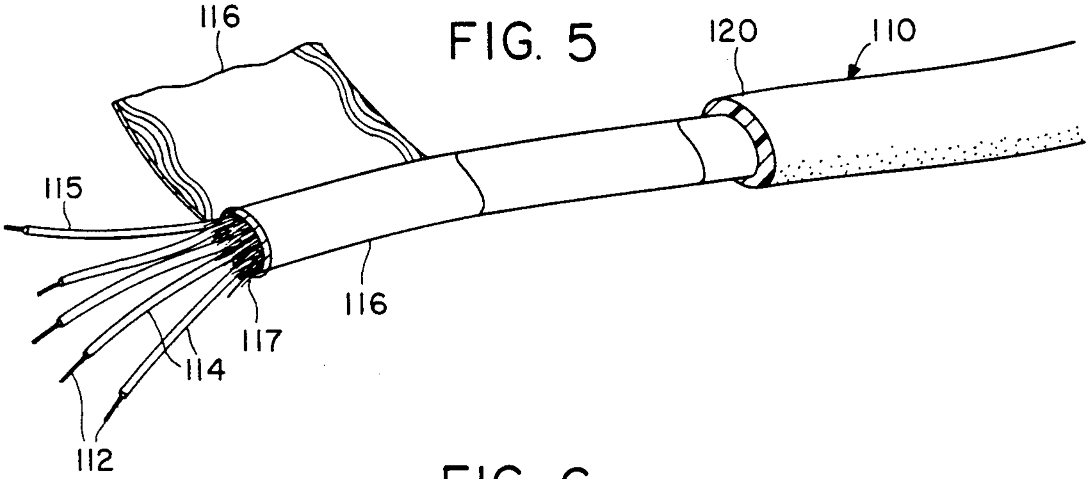
FIG. 6
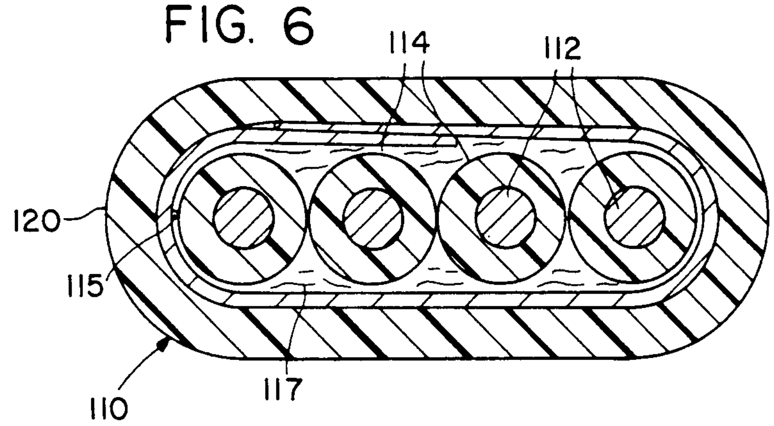

ELECTRICAL CABLES AND SERPENTINE PATTERN SHIELDING TAPE THEREFOR

BACKGROUND

1. Field of the Invention

The present invention relates to electrical cables and more particularly, to electrical cables and shielding tapes therefor having parallel serpentine pattern adhesive strips thereon for securing the shielding tape to and around conducting and insulating elements within the cables.

2. Description of the Prior Art

Electrical cables are well known in the electronics industry. They generally comprise an electrical conducting element, e.g. a copper wire, surrounded by a dielectric element or an insulator, which in turn is covered by a metallic shield. Around the shield is a conductive braid, followed by an outer protective coating or jacket.

In order to bind the metallic shield to the insulating element, those skilled in the art generally use adhesives. These adhesives also function to prevent the introduction of moisture into the enclosed conducting and insulating elements which can corrode and short circuit the cable. If properly applied, the adhesive also enables the metal in the shield's upper surface and its lower surface to contact when the shield is wrapped around the insulating element so that its two ends overlap. Such metal-to-metal contact is necessary to prevent or reduce electrical or electromagnetic interference in the electrical cable system.

Several means for preventing such undesirable effects in the electrical cable have previously been proposed. For example, U.S. Pat. No. 4,746,767 discloses a metal foil shielding tape having a plurality of square-shaped exposed metal contact pads defined in rows and columns in a checkerboard pattern by an adhesive. When positioned around an insulator in a cable, a top side of the shielding tape overlaps with a bottom side of such tape and the adhesive connects both the insulating member and the lower surface of the shielding tape to the shielding upper surface of the shielding tape. However, under the disclosed arrangement of contact pads and adhesive, the size of the barrier to electrical or electromagnetic interference is limited.

In practice, the coated surface of the prior art tape covers 75% of the surface of the foil and the uncoated pads cover the remaining 25% of the surface area. Where greater metal-to-metal contact is desired, the uncoated area may be increased; but at best, the contact pads of such prior art tapes may only cover fifty percent of the total surface area. This is because any greater uncoated area would result in localized or isolated, noncontiguous adhesive pads which cannot assure against moisture penetration. If the metal-to-metal contact of the upper and lower surface of the shield tape could be increased in the overlapping areas while maintaining the moisture-retardant effect of the adhesive, a more effective shield will result.

The disadvantages of the prior art are overcome by the present invention which achieves a greater metal-to-metal contact area because of a greater amount of uncoated material in a shielding tape for an electrical cable with a minimal amount of overlap between one side of the shielding tape and the other side. This is achieved by the application of a series of parallel serpentine shaped strips of adhesive onto one surface of a metal shielding tape to form a unique and particularly advantageous bonding pattern.

SUMMARY OF THE INVENTION

The present invention is summarized in that a metal shielding element for an electrical cable is provided in the form of a tape which is arranged so that adhesive strips are configured on a top surface of the shielding tape in a parallel serpentine pattern. The tape is placed in use such that it surrounds the insulator within the cable with the shielding tape's top surface overlapping with its bottom surface. Due to the parallel serpentine adhesive strips between the top surface and the bottom surface in the overlap, an effective seal against moisture may be achieved. Additionally, contact between the metallic portion of the top surface and the metallic bottom surface achieves a barrier to electrical and electromagnetic interference within the electrical cable. The parallel serpentine adhesive strips also function to securely connect the shield to the insulator.

It is an object of the present invention to create an adhesive connection between a top surface and a bottom surface of a shielding tape to prevent the introduction of damaging moisture into an electrical cable.

It is another object of the invention to form a metal-to-metal contact between the top and bottom of the shielding tape so as to reduce the introduction of electrical interference or noise in an electrical cable.

It is another object of the invention to achieve the maximum metal-to-metal contact in the overlap of the shielding tape so as to minimize electrical and electromagnetic interference.

It is a further objection of the invention to minimize the overlap between the top and bottom surfaces of the shielding tape so as to minimize the use of such tape.

The present invention is advantageous over prior art shielding tapes in that it creates an effective electrical, electromagnetic and moisture barrier with a minimal amount of adhesive through the use of a parallel, nested serpentine adhesive pattern. Other objects and advantages of the present invention will become apparent from the preferred embodiments when taken in conjunction with the accompanying drawings.

BRIEF DESCRIPTION OF THE DRAWINGS

FIG. 1 is a plan view of a preferred embodiment of a serpentine pattern shielding tape in accordance with the present invention;

FIG. 2 is a sectional view of the shielding tape of the present invention taken along line 2—2 of FIG. 1;

FIG. **2*a*** is a partial sectional view of a modified form of the shielding tape of the present invention;

FIG. 3 is a perspective view, with parts broken away, of a preferred embodiment of an electrical cable of the Local Area Network or LAN type incorporating the shielding tape of FIG. 1 in accordance with the present invention;

FIG. **3*a* is a perspective view of a modified form of the cable of FIG. 3** in accordance with the present invention;

FIG. 4 is a sectional view of the electrical cable of FIG. 3 of the present invention;

FIG. 5 is a perspective view, with parts broken away, of a preferred embodiment of an electrical cable of the shielded flat cable type incorporating the shielding tape of FIG. 1 in accordance with the present invention; and FIG. 6 is a sectional view of the electrical cable of FIG. 5 of the present invention.

DESCRIPTION OF THE PREFERRED EMBODIMENT

The present invention relates to an electrical cable having a unique shielding tape which shields the cable from electrical and electromagnetic interference as well as from moisture. As shown in FIGS. 1 through 4, an electrical cable 10 generally comprises an inner conducting element 12, a first insulator 14, a shielding tape 16, a conductive braid 18 and an outer protective jacket 20. In full assembly, the conducting element 12 is surrounded by the first insulator 14, which is securely wrapped within the shielding tape 16. The conductive braid 18 surrounds the shielding tape 16, which is enclosed by the outer protective jacket 20. In most cases, the conductors are constructed of aluminum or copper and the insulators are composed of polyolefin, polyester, and/or fluorocarbon resins.

As shown in FIGS. 1 through 4, the shielding tape 16 itself is configured so as to be securely connected to and around the insulator 14. The shielding tape 16 is preferably constructed of a laminate or triplex laminate. If the shielding tape 16 is a laminate, as shown in FIG. 2, it may consist of a layer of metal foil 16*a* and adhesive layer 22. The foil may be made of any suitable metal, such as aluminum and the thickness of the layers may be of any suitable dimension. Similarly, if the shielding tape is a triplex laminate, as shown in FIG. 2*a*, a plastic film 16*b* is preferably positioned between two layers of foil 16*a* and 16*c* made of any suitable metal, such as aluminum, and again the thickness of the layers may be of any suitable dimension.

A secure connection to and around the insulator 14 is achieved by a plurality of serpentine strips 22 of a suitable adhesive film which is coated onto a top side 24 of the shielding tape 16. The coating can be deposited onto the metallic shielding tape 16 by means of appropriate coating techniques well known to those to those skilled in the art. The plurality of serpentine films 22 are configured so that the indentation or undulation of one serpentine strip nests within the indentation or undulation of an adjacent serpentine strip. Thus between each strip of serpentine film 22 is the exposed metallic surface 26 of the shielding tape forming contact strips in a discontinuous pattern for a metal-to-metal connection.

The adhesive film 22 may be pressure sensitive or may be any other suitable type, but preferably consists of a heat fusible coating such as ethylene acrylic acid. The coating strips may be of any suitable dimension, but have been found to be particularly satisfactory in the range of from 0.00005 inches to 0.002 inches in thickness and from 1/32 inches to 5/32 inches in width. Correspondingly, the spacings between the serpentine coated areas or the width of the exposed metallic areas may be of any suitable dimension, but the range of from 1/32 inches to 5/32 inches has been found to be particularly satisfactory.

When applied to an electrical cable such as the cable 10 depicted in FIGS. 3 and 4, the shielding tape 16 is spirally wrapped around the insulator 14 so that it attaches to the insulator and overlaps slightly at one area 28, best depicted in FIG. 4. In a modified form of the cable in accordance with the present invention, the shielding tape may be longitudinally wrapped around the insulator, as depicted in FIG. 3*a*. For purposes of clarity, all of the components of FIG. 3*a* which are similar to those in FIG. 3 have been identified with similar primed numbers. In order to form a secure seal, the overlap is necessary.

The strength of the bond between the top side 24 of the shielding tape and its bottom side 30 is important since the bond prevents the introduction of moisture to the inner conducting member 12 and the first insulator 14. It is well known that moisture can damage a cable by corroding or short circuiting the conducting member 12. The extent of the tape overlap is discretionary between the centers of two adjacent serpentine strips 22 so as to form a secure bond.

Similarly, strong adhesion between the shielding tape 16 and the first insulator 14 is necessary to ensure that the tape 16 is securely connected to the first insulator 14. This is also accomplished by the various serpentine elements 22 which lie along the shielding tape 16. Thus, the shielding tape 16 is held in position by discontinuous, adhesive, serpentine strips 22 connecting the first insulator 14 and the shielded tape 16, and by adhesion between the top 24 and bottom 30 sides of the shielded tape 16 when overlapped.

The discontinuous serpentine configuration and related dimensions of the adhesive coating are an important advance over the prior art. It is commonly known that passing electrical signals and radiation can interfere with the operation of an electrical cable. To prevent such occurrences, the metallic shielding tape is necessary. For maximum protection against the interference of electromagnetic radiation into the operation of the electrical cable and to reduce radiation leakage, the top metal side of the shielding tape must contact the metal on the ) bottom side of the shielding tape. A connection is achieved by the present invention through the serpentine pattern film 22 as disclosed above. In between the serpentine strips 22 of the adhesive coating are exposed metallic strips 26 of the shielding material which, by means of the connection of the fusible film 22, contact the bottom of the tape 30. Consequently, a metal-to-metal seal is achieved along the length of the cable 10, minimizing the electrical interference which would otherwise occur. Such a configuration is an improvement over the prior art wherein only discrete contact pads were known, providing for limited metal-to-metal contact.

The strength of the fusible film or adhesive may vary depending on the required use of the shielding tape. In some instances a very strong bond is necessary so that when a connector is placed on the cable for termination, the bonded shielding tape will stay in place and not push back. In other instances, a tape with a reduced bond to the insulator and at the overlap is desirable so that the shielding tape can be stripped away cleanly for termination to the connector.

The electrical cable of FIGS. 3, 3*a* and 4 according to the present invention is of the coaxial type or Local Area Network (LAN) type frequently used in computer and other electrical networking applications. The shielding tape of the present invention also may be used in a flat cable, as shown in FIGS. 5 and 6. In FIGS. 5 and 6, parts similar to those in the cable of FIGS. 3 and 4 are given similar numbers with 100 added for purposes of clarity.

Flat cable 110 contains a plurality of conductors 112, each having an insulating coating 114. A bare metallic drain wire 115 also is sometimes used. The group of insulated conductors is surrounded by a non-conducting structurally reinforcing fiber bundle 117 and the entire assembly is wrapped with the serpentine pattern shielding tape 116, as shown. A protective outer coating 120 completes the cable. The drain wire is connected to ground at the termination point or connector (not shown). This configuration eliminates static charge in the cable. The coated area will fuse to the jacket or, if wrapped around the cable, will heat fuse at the overlap or to the insulated wires. The flat cable 110 of FIGS. 5 and 6 exhibits the same excellent electrical interference resistance and moisture leakage prevention as does the LAN type cable described above and illustrated in FIGS. 3, 3a and 4.

Inasmuch as the present invention is subject to many variations, modifications and changes in detail, it is intended that all matter contained in the foregoing description or shown in the accompanying drawings shall be interpreted as illustrative and not in a limiting sense.

What I claim is:

1. A metal shielding tape for an electrical cable, said tape having a top and a bottom surface and having an adhesive coating on the top surface thereof in a pattern of parallel serpentine strips extending longitudinally thereon.

2. The metal shielding tape as claimed in claim 1, wherein said adhesive coating comprises ethylene acrylic acid.

3. The metal shielding tape as claimed in claim 1, wherein said adhesive coating has a thickness of between 0.00005 inch and 0.002 inch.

4. The metal shielding tape as claimed in claim 1, wherein said serpentine strips have a width from 1/32 inch to 5/32 inch.

5. The metal shielding tape as claimed in claim 1, wherein said serpentine strips are spaced apart by 1/32 inch to 5/32 inch.

6. The metal shielding tape as claimed in claim 1, wherein said adhesive coating is heat fusible.

7. The metal shielding tape as claimed in claim 1, wherein said adhesive coating is pressure sensitive.

8. The metal shielding tape as claimed in claim 1, wherein said shielding tape consists of a laminate of aluminum foil, a layer of plastic film, and a layer of aluminum foil.

9. The metal shielding tape as claimed in claim 1, wherein said shielding tape comprises a metallic layer on which said adhesive coating is applied.

10. An electronic cable comprising:

an elongated conducting member;

an insulator surrounding the conducting member;

and a metal shielding tape having a top and a bottom side and surrounding the insulator, said metal shielding tape having an adhesive coating on the top side thereof in a pattern of parallel serpentine strips extending longitudinally thereon, whereby said cable is effectively protected against electrical interference and moisture penetration.

11. An electronic cable as claimed in claim 10, wherein said shielding tape is longitudinally wrapped around the insulator so that a top end of said shielding tape overlaps with a bottom end of said shielding tape, causing a connection between the serpentine coating and the bottom side of the shielding tape when the top and bottom sides overlap.

12. An electronic cable as claimed in claim 10, wherein said shielding tape is spirally wrapped around the insulator so that a top end of said shielding tape overlaps with a bottom end of said shielding tape, causing a connection between the discontinuous serpentine coating and the bottom side of the shielding tape when the top and bottom sides overlap.

13. An electronic cable as claimed in claims 11 or 12, wherein said shielding tape further comprises a metallic layer on which said adhesive coating is applied.

14. An electronic cable as claimed in claims 11 or 12, wherein said shielding tape further comprises a triplex laminate of a layer of aluminum foil, a layer of plastic film and another layer of aluminum foil.

15. An electronic cable as claimed in claims 11 or 12, wherein the adhesive coating of said shielding tape comprises ethylene acrylic acid.

16. An electronic cable as claimed in claims 11 or 12, wherein the adhesive coating of said shielding tape ranges in thickness from 0.00005 inch to 0.002 inch.

17. An electronic cable as claimed in claim 16, wherein said serpentine strips have a width from 1/32 inch to 5/32 inch.

18. An electronic cable as claimed in claim 16, wherein a first strip of said serpentine pattern adhesive coating is spaced from a second strip thereof by 1/32 inch to 5/32 inch.

19. An electronic cable as claimed in claims 11 or 12, wherein said coating on said shield tape is heat fusible.

20. An electronic cable as claimed in claims 11 or 12, wherein said coating on said shield tape is pressure sensitive.

* * * * *